Dec. 13, 1932.    H. O. LENZ    1,890,736
COMBINATION REEL
Filed Oct. 25, 1930    2 Sheets-Sheet 1
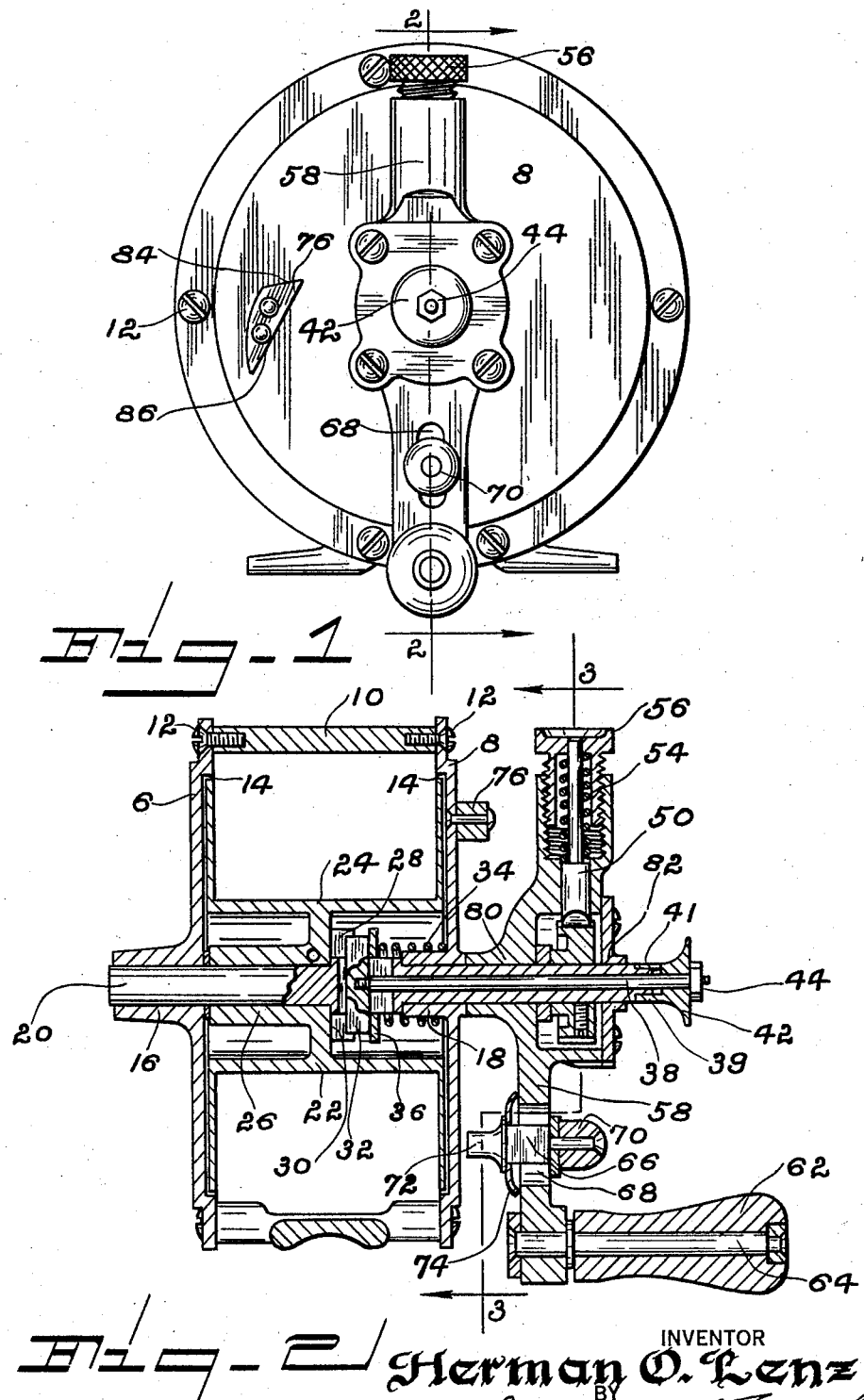
INVENTOR
Herman O. Lenz
BY
Smith & Tuck
ATTORNEYS Dec. 13, 1932.  H. O. LENZ  1,890,736
COMBINATION REEL
Filed Oct. 25, 1930  2 Sheets-Sheet 2

INVENTOR
Herman O. Lenz
BY
Smith & Tuck
ATTORNEYS

Patented Dec. 13, 1932

1,890,736

UNITED STATES PATENT OFFICE

HERMAN O. LENZ, OF SEATTLE, WASHINGTON

COMBINATION REEL

Application filed October 25, 1930. Serial No. 491,118.

My present invention relates to the art of fishing reels, and more particularly to a combination reel which is so arranged that it is of special value in handling large game fish, either while trolling or while casting for the same.

Angling for game fish places unusual requirements upon a fishing reel and particularly so if heavy weights are used, either for casting or when trolling. In my present invention I provide a very simple mechanism for producing a very easy running free-spool reel, and at the same time I provide a brake which is easily adjusted, which will not overheat when put to severe use, and one which is unusually easy to adjust as the conditions vary while fighting a game fish. Therefore:

The principal object of my invention is to provide a combination reel of simple construction which may be used for either casting or trolling without any structural changes.

A further object is to provide a free-spool mechanism wherein nothing but the line-holding reel itself revolves when a cast is made.

A further object is to provide an adjustable ratchet brake wherein the braking effort is obtained by the compression of a spring.

Other and more specific objects will be apparent from the following description taken in connection with the accompanying drawings, wherein:

Figure 1 is an elevation showing the handle end of my reel.

Figure 2 is a cross-sectional view along the line 2—2 of Figure 1.

Figure 3:
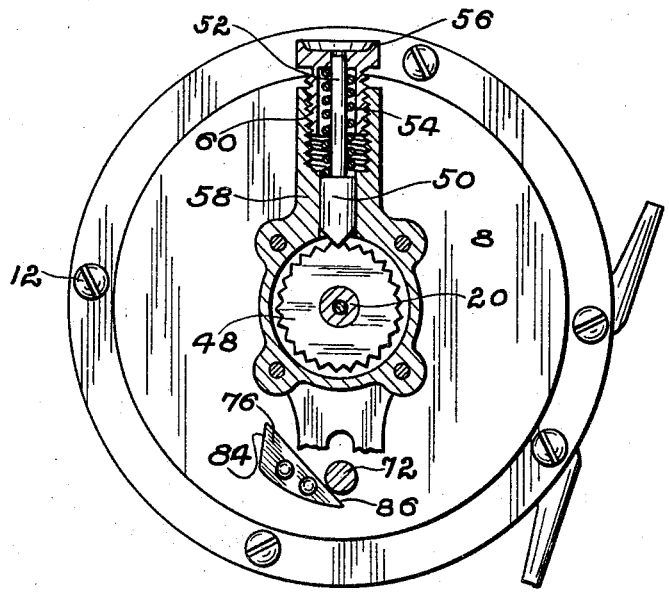
Figure 3 is an end elevation similar to Figure 1, excepting the reel has been turned through a partial revolution and the handle is sectioned along the line 3—3 of Figure 2.

Referring to the drawings throughout which like reference characters indicate like parts, numerals 6 and 8 represent respectively the end plates of my reel. These are joined together by suitable studs 10 and the securing screws 12, several of these studs being used. I prefer to follow the well known practice of recessing the end plates at 14 so that the line will be protected from overriding the edges of the spool. End plate 6 is provided preferably with an outwardly extending bearing 16. Plate 8 is provided with an inwardly extending bearing 18. These two bearings, which are coaxially disposed, support the through shaft 20. Journaled upon shaft 20 is the line holding spool 22. This I normally prefer to provide with a fairly large diameter hub as indicated at 24 and to use only a portion of the available length to form a journal 26.

The other portion of hub 24 I prefer to use as a housing for my free-spool mechanism. Free-spooling is accomplished by forming within hub 24 the outstanding jaw members 28 which have disposed between them a key receiving recess or slot 30. Adapted to engage slot 30 is a key member 32. This member is adapted to slide within a slot cut in an enlarged portion of shaft 20, the slot being extended sufficiently to permit key 32 being drawn clear of the jaw members 28. A coil spring 34 is disposed around bearing 18 and adapted to urge washer 36 against key 32. The key is prevented from dropping out of position and also is manually drawn from slot 30 by means of rod 38, which is secured to it. Shaft 20 has an axially disposed bore extending from slot 40 to the handle end of shaft 20, which provides an excellent position for rod 38.

An operating knob 42 is slidably mounted upon rod 38 and prevented from slipping off the end of the same by either a head or nut on the end of the rod, as is indicated at 44.

Figure 4:
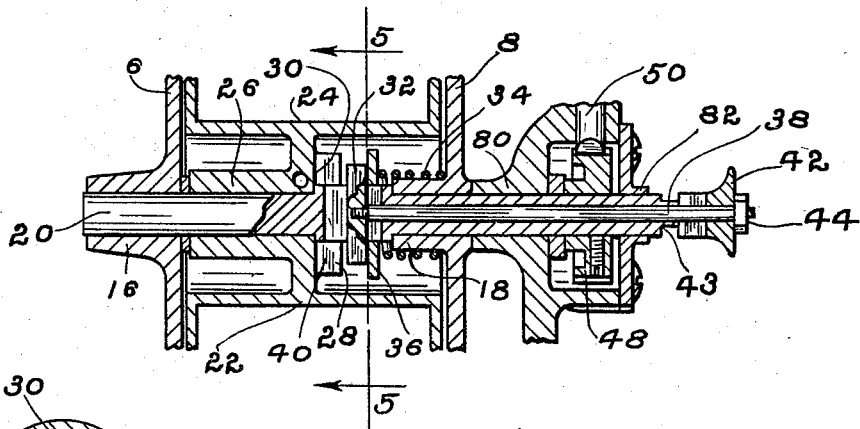
Figure 4 is a fragmentary sectional view showing the free-spool mechanism, similar to Figure 2 except that the spool is in the released position.
Figure 5:
Figure 5 is a cross-sectional view along the line 5—5 of Figure 4.

It is desirable to provide means for holding knob 42, rod 38 and key 32 in the free-spooling position as indicated in Figure 4. This may be accomplished by slotting knob 42 to provide the side members 39 and 41. The end of shaft 20 is formed as a tenon 43 adapted to coact with 39 and 41 to produce a jaw engagement. When it is desired to maintain the free-spool condition knob 42 is withdrawn and turned so that members 39 and 41 ride on the top of tenon 43.

Secured in any convenient manner to shaft 20 is the ratchet wheel 48. Radially disposed with respect to wheel 48 is a coacting pawl member 50. This is provided with a guide member 52, about which is disposed a coil spring 54 and which in turn has disposed about it the counterbored adjusting nut 56. Nut 56 is adjustably secured within the end of handle 58 by means of the threads indicated at 60. At the opposite end of handle 58 is the handgrasp 62. This may be of any preferred construction but should preferably have a member which revolves upon a central spindle as 64.

Disposed between handgrasp 62 and shaft 20 is the stop 66 which is mounted so as to be slidable longitudinally of handle 58 as within the slot 68. A finger button is provided at 70 and an inwardly extending stud 72 is positioned at the other end of member 66. Frictional locking means is provided in the spring member 74. Member 66 is so mounted upon handle 58 that it may slide sufficiently to either clear or engage, at the will of the operator, the outwardly extending stop 76.

Handle 58 is preferably disposed to normally turn free upon shaft 20, it being revolvably supported thereon by the bearings at 80 and 82. It also serves to house the ratchet wheel 48, the pawl 50 with its associated spring 54. It should be understood that the pawl and ratchet form the only driving connection between handle 58 and shaft 20, and further that when spring 54 is fully compressed the handle and shaft 20 are positively locked together.

Method of operation

In operating my invention, let it be assumed that the fisherman is casting. The first operation then will be to pull out knob 42. This will free the spool 22 and as the cast is made the line will have merely its revolving spool 22 and whatever line may be upon it. All the rest of the mechanism remains stationary, including shaft 20. This means that but very little inertia must be overcome in making the cast. Having completed the cast the fisherman will of necessity reel in his line. First, however, it will be necessary to re-engage the spool. This is accomplished by shoving knob 42 in until it assumes the position indicated in Figure 2. Figure 4 shows the free position. It will then be merely necessary that the spool or shaft 20 be revolved until key 32 is in line with slot 30. Spring 34 will then complete the engagement by urging key 32 into slot 30. As the handle 58 is revolved spool 22 will now be carried with it, assuming, of course, that pawl 50 is in engagement with ratchet 48.

Let us assume that the fisherman obtains a strike from a fish as he is reeling in. Now as he continues to revolve handle 58 he will be placing upon the fishing line a strain which he has pre-determined, that is by an appropriate setting of nut 56. If now the fish pulls harder on the line than the pre-determined setting pawl 50 will be forced up against spring 54 and will allow the fish to carry out the line against the steady braking action produced by the pawl operation. This will give notice to the fishermen by a pronounced clicking noise as the pawl passes over successive notches in the ratchet 48. This clicking will only occur when either the handle or spool is moving with respect to the other. If the fisherman now finds that because of the size of the fish that he wishes to increase or decrease the strain on the line he will allow handle 58 to revolve in the reverse direction with members 66 in its outermost position. Something less than one complete revolution of handle 58 will bring stud 72 into contact with stop 76. This stop is provided with an angled surface 84 which tends to securely retain stud 72. The handle motion has now been stopped, even though the fish might be still taking out line and the operator has his reel hand free to adjust the knurled nut 56 and either increase or decrease the tension as may be desired by either screwing in on member 56 or by unscrewing the same. This provides an increased or decreased tension, respectively, upon spring 54, which in turn provides a change of strain.

It may now be assumed that the fisherman wishes to continue reeling in his line. This is accomplished by grasping handle 62 and revolving it in the proper direction. Just before the completion of the first revolution stud 72 will come in contact with the cam surface 86 of stop 76 and member 66 will be forced inwardly towards shaft 20 and will not further interfere with the operation of the reel.

The foregoing description and the accompanying drawings are believed to clearly disclose a preferred embodiment of my invention but it will be understood that this disclosure is merely illustrative and that such changes in the invention may be made as are fairly within the scope and spirit of the following claims:

What I claim is:

1. A fishing reel consisting of spaced side plates having bearings therein; a revolvable shaft disposed within said bearings; a line holding spool journaled upon said shaft; a hollow handle revolvably mounted upon said shaft having disposed therein a ratchet fixedly secured to said shaft; a pawl adapted to engage said ratchet; an adjustable nut disposed upon said handle; and a spring arranged for co-action with said nut to provide variable spring tension, disposed between said pawl and said nut adapted to urge said pawl into engagement with said ratchet.

2. A fishing reel consisting of spaced side plates having bearings therein; a revolvable shaft disposed within said bearings having a slot, near its center, extending longitudinally thereof; a hollow handle revolvably mounted upon said shaft having disposed therein a ratchet fixedly secured to said shaft; a pawl adapted to engage said ratchet; an adjustable nut; a spring disposed between said pawl and said nut adapted to urge said pawl into engagement with said ratchet; a line holding spool journaled upon said shaft; a clutch member secured to said spool; a second clutch member, disposed within the slot of the revolvable shaft, and adapted to co-act with the first named clutch member to engage or disengage the spool; and means for operating said second clutch member.

3. A fishing reel consisting of spaced side plates having bearings therein; a revolvable shaft disposed within said bearings having a longitudinally extending slot near its center, and having an axially disposed bore extending from said slot to the handle end of said shaft; a hollow handle revolvably mounted upon said shaft having disposed therein a ratchet fixedly secured to said shaft; a pawl adapted to engage said ratchet; an adjustable nut; a spring disposed between said pawl and said nut adapted to urge said pawl into engagement with said ratchet; a line holding spool journaled upon said shaft; a clutch member secured to said spool; a second clutch member, disposed within the slot of the revolvable shaft, and adapted to co-act with the first named clutch member to engage or disengage the spool; an operating rod secured to the second clutch member and extending through the axial bar of the revolvable shaft; and an operating knob for said rod.

4. A fishing reel consisting of spaced side plates having bearings therein; a revolvable shaft disposed within said bearings; a line holding spool journaled upon said shaft; a hollow handle revolvably mounted upon said shaft having disposed therein a ratchet fixedly secured to said shaft, a pawl adapted to engage said ratchet, an adjustable nut disposed upon said handle, and a spring, arranged for co-action with said nut to provide variable spring tension, disposed between said pawl and said nut adapted to urge said pawl into engagement with said ratchet; a stationary stop fixedly secured to the side plate adjacent to the handle; an inwardly extending stud slidably secured to said handle and a finger button secured to said stud, on the opposite side of the handle therefrom and adapted to facilitate movement of said stud.

5. A fishing reel consisting of spaced side plates having bearings therein; a revolvable shaft disposed within said bearings; a line holding spool journaled upon said shaft; a hollow handle revolvably mounted upon said shaft having disposed therein a ratchet fixedly secured to said shaft; a pawl adapted to engage said ratchet; an adjustable nut; and a spring disposed between said pawl and said nut adapted to urge said pawl into engagement with said ratchet; an inwardly extending stud, slidably secured to the handle; a finger button secured to said stud and adapted to facilitate movement of said stud; a stop, fixedly secured to the side plate adjacent to the handle; having a stop surface adapted to engage said stud and to urge it outwardly to the extreme of its travel within the handle and another surface of said stop formed as a cam and so disposed that when the handle is turned in a direction, opposite that required to engage the first named surface, the stud will be engaged in a manner urging it to the extreme inner limit of its travel in the handle.

In witness whereof, I have hereunto subscribed my name this 10th day of October A. D. 1930.

HERMAN O. LENZ.